United States Patent
Winter (10) Patent No.: US 6,636,691 B2
(45) Date of Patent: *Oct. 21, 2003

(54) APPARATUS FOR PROCESSING A CONTROL COMMAND SEQUENCE AS WELL AS A METHOD FOR GENERATING A CONTROL COMMAND SEQUENCE, AND A STORAGE MEDIUM FOR STORING A CONTROL COMMAND SEQUENCE

(75) Inventor: Marco Winter, Hannover (DE)

(73) Assignee: Thomson Licensing, S.A., Boulogne-Billancourt (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/044,719

(22) Filed: Mar. 19, 1998

(65) Prior Publication Data

US 2003/0133698 A1 Jul. 17, 2003

(30) Foreign Application Priority Data

Mar. 27, 1997 (DE) .......................... 197 13 069

(51) Int. Cl.⁷ .......................... H04N 5/781; H04N 7/00; H04N 7/08
(52) U.S. Cl. .......................... 386/95; 386/125; 386/126; 348/461; 348/473
(58) Field of Search .......................... 386/83, 46, 95, 386/1, 45, 125–126; 369/47, 48, 54, 58, 59; 712/229, 231, 234, 233, 208, 300, 214, 200, 36, 245; 709/100, 106; 717/1–5; 708/3; 348/461, 465, 467, 468, 473, 476, 477–479

(56) References Cited

U.S. PATENT DOCUMENTS

| | | | |
|---|---|---|---|
| 4,262,330 A | | 4/1981 | Berglund et al. |
| 5,276,802 A | | 1/1994 | Yamaguchi et al. |
| 5,469,550 A | * | 11/1995 | Cezzar ...................... 712/229 |
| 5,995,155 A | * | 11/1999 | Schindler et al. ........... 348/552 |
| 6,206,829 B1 | * | 3/2001 | Iliff ............................. 600/300 |
| 6,219,796 B1 | * | 4/2001 | Bartley ....................... 713/320 |

FOREIGN PATENT DOCUMENTS

| | | |
|---|---|---|
| EP | 0324308 | 7/1989 |
| EP | 0737980 | 10/1996 |

OTHER PUBLICATIONS

Charles Calvert, Turbo Pascal Programming 101, Sams Publishing, 1993, pp. 1–4, 226, 283–287 and 402–407.*
Hauptmann, K.; Opitz, W. Technik der datenverarbeitenden ProzeBrechner, Energieelektronik Verlag, Frankfurt, 1975, S. 166–172.
Search Report for EPO Appln. No. 98104635 dated Sep. 3, 2001.

* cited by examiner

Primary Examiner—Thai Tran
(74) Attorney, Agent, or Firm—Joseph S. Tripoli; Reitseng Lin (57) ABSTRACT

Control command processing apparatus has first decoding means which decodes a predetermined set of control commands. When a first end command is processed, the address of the end command is compared with an address information item with regard to the beginning of the next control command sequence and, from the difference between the addresses it is identified whether the end command is additionally followed by further control commands of a second set of control commands. These commands are then processed by further decoding means. Undefined states are thereby prevented.

11 Claims, 5 Drawing Sheets

| | | | |
|---|---|---|---|
| $0000 : | 09 EC | SPDSZ = 2540 = $09EC | |
| $0002 : | 09 C7 | SP_DCSQTA = 2503 =$09C7 | |

$0004 :      PXDT
...

$04E6 :      PXDB
...

| | | |
|---|---|---|
| $09C7 : | 00 00 | SP_DCSQ_STM=0 |
| $09C9 : | 09 E7 | SP_NXT_DCSQ_SA=2535=$09E7 |
| $09CB : | 03 48 12 | SET_COLOR b=2 p=1 e1=8 e2=4 |
| $09CE : | 04 FF F0 | SET_CONTR b=0 p=15 e1=15 e2=15 |
| $09D1 : | 05 0E B1 E5 0F A1 2C | SET_DAREA sx=235 ex=485 sy=250 ey=300 |
| $09D8 : | 06 00 04 04 E6 | SET_DSPXA uf=$0004 bf=$04E6 |
| $09DD : | 01 | STA_DSP |
| $09DE : | FF | CMD_END |
| $09DF : | 08 0E B1 E5 0F A1 2C | SET_BAREA sx=235 ex=485 sy=250 ey=300 |
| $09E6 : | FF | CMD_END |
| $09E7 : | 03 6F | SP_DCSQ_STM=879≙10sec |
| $09E9 : | 09 E7 | SP_NXT-DCSQ_SA=$09E7 |
| $09EA : | 02 | STP_DSP |
| $09EB : | FF | CMD_END |

APPARATUS FOR PROCESSING A CONTROL COMMAND SEQUENCE AS WELL AS A METHOD FOR GENERATING A CONTROL COMMAND SEQUENCE, AND A STORAGE MEDIUM FOR STORING A CONTROL COMMAND SEQUENCE

Apparatus for processing a control command sequence as well as a method for generating a control command sequence, and a storage medium for storing a control command sequence.

The invention relates to an apparatus for processing a sequence of control commands for a unit to be controlled as well as a method for generating a sequence of control commands for a unit to be controlled, and a storage medium for storing a sequence of control commands of a unit to be controlled.

PRIOR ART

The invention is based on an apparatus for processing a sequence of control commands for a unit to be controlled of the generic type of the independent claim 1. Such an apparatus has recently become known by virtue of the fact that the DVD (Digital Versatile Disc) playback devices that are the latest additions to the market have a so-called sub-picture decoding unit (sub-picture decoder). These sub-picture decoding units are designed according to the specification described in the DVD Standard (Version 1.0). A specific command set for control commands for driving the display unit is described and agreed in the DVD Standard (Version 1.0). The control commands and, if appropriate, video data are stored in a sub-picture unit. However, only very few control commands for the display control are provided in the current DVD standard. It may therefore be expected that in future DVD standardization proposals with version numbers greater than 1.0, additional control commands which are not yet contained in the current DVD standard (version 1.0) will be defined in order to make the display control even more convenient. If a sequence of control commands in which newly defined control commands also occur is therefore stored on storage media, for example the DVD disk, then the problem that currently exists is that such control command sequences cannot be processed in a compatible manner by a DVD playback device which has been developed according to today's standardization proposal.

INVENTION

The aim of the invention is to take account of the above-described problem today, at an early stage, and, on the one hand, to design new playback devices in such a way that they can process the new control commands without any problems and, on the other hand, to arrange the new control commands in a sub-picture unit in such a way that even the playback devices which are designed according to the current DVD standard (Version 1.0) can decode the sub-picture unit having new control commands, without entering into an undefined state.

The object with regard to the new playback devices is achieved according to the invention by means of the measures specified in claim 1. The invention provides an apparatus for processing a sequence of control commands for a unit to be controlled, which is equipped with first decoding means for the control commands that have already been defined today, and which is additionally distinguished by the fact that the first decoding means (22) are designed in such a way that when a first end command (CMD_END) is processed, they carry out a comparison of the address of the end command (CMD_END) with an address information item regarding the start address (SP_NXT_DCSQ_SA) of the next control command sequence (SP_DCSQ1, SP_DCSQ2) and identify, from the difference between the addresses, whether the first end command is additionally followed by at least one further control command (SET_BAREA) which is selected from a second set of control commands (SET_BAREA). In addition, the apparatus has further decoding means which are designed in such a way that they can process the new control commands.

These measures have the advantage that the new playback devices can process the control command sequence including the newly defined control commands without any problems.

Advantageous developments and improvements of the apparatus specified in Claim 1 are possible by virtue of the measures evinced in claims 2–9. Thus, for example, it is very advantageous if, in the case where a next sequence of control commands is not provided, the address information item regarding the start address of the next control command sequence points to the beginning of the last sequence of control commands and then, when the address information item regarding the start address of the next control command sequence is decoded following the decoding of the further end command, the control of the unit to be controlled is set or the last sequence of control commands is repeated. If no abort criterion is provided for the resultant loop, then an endless loop is created which can be interrupted by external intervention.

If the last control command sequence is being processed, the address information item regarding the start address of the next control command sequence points to the beginning of the last control command sequence. It is then advantageous if the first decoding means are designed in such a way that they check whether the address of the first end command is the last or penultimate address of the control program unit, and that if the address is not the last or penultimate address, it is identified that at least one further control command will follow after the decoded end command and be processed by the further decoding means. The abovementioned sub-picture unit is cited as an example of the control program unit. These measures ensure that additional commands may be contained in the last control command sequence, too, and are able to be processed reliably by an appropriately designed playback device.

Display control commands come into consideration as control command and are then provided for the control of a display unit. On the other hand, the control commands may also relate to printer control commands or control commands for other units.

The second part of the object of the invention is achieved by the method for generating a sequence of control commands for a unit to be controlled in accordance with claim 10. It is advantageous for such a method if the sequence of control commands has first control commands which, as it were, correspond to the control commands already defined today, and additionally has second control commands which correspond to the extended control commands, the second control commands being arranged in combination after the known, first control commands in the sequence and being separated from the first control commands by an end command. The result achieved by this is that the conventional playback devices ignore the new control commands without entering into an undefined state. As a result of the characteristic of conventional playback devices whereby when an end command is decoded, they read out an address information item on the beginning of the control command sequence and begin the processing of the next control command sequence at the location specified by the address information item, these playback devices will ignore the additional control commands arranged after the end command and, therefore, will not enter into an undefined state. Undefined behaviour of the DVD playback devices designed according to the DVD standard (Version 1.0) is avoided.

The generated sequence of control commands is advantageously stored on a storage medium. A storage disk or a magnetic tape comes into particular consideration for this purpose.

The control commands are then advantageously stored sequentially one after the other on such a storage medium. Firstly, the known control commands should follow one after the other and then they should be followed by the new or further control commands. At the same time, the new control commands should be separated from the conventional control commands by an end command.

DRAWINGS

Exemplary embodiments of the invention are illustrated in the drawings and are explained in more detail in the description below.

In the figures.

DESCRIPTION OF THE INVENTION

The invention is explained in more detail using the example of a sub-picture decoding unit of a DVD playback device. In the exemplary embodiment, a rectangular detail area on a display unit is regarded as the sub-picture. The exemplary embodiment described here assumes that a television receiver serves as the display unit. The control commands in this case relate to commands which effect the display of a sub-picture on the television receiver. The sub-picture is displayed on the screen of the television receiver. This may, for example, involve a rectangular detail in the picture which is provided for example for the display of subtitles in the case of foreign language films. Of course, other applications also come into consideration for such sub-pictures. For example, it is also possible in this way to display error messages on the screen, or specific operating directions after they have been called up by the user of the device. For this case, operating instructions can be stored in the device to be operated. If the device to be operated is a DVD playback device, for example, then the sub-picture may also serve for example to display a text for a karaoke function. In this case, the text of a music title which is to be sung is displayed in a subtitle line and the respective passage to be sung is highlighted.

All sub-pictures of this type are stored in a so-called sub-picture unit (SPU). In the case of error messages, the sub-picture units are stored in a read-only memory, for example. For the case of subtitles, these sub-picture units are usually stored on a storage medium such as, for example, a video cassette or a storage disk (DVD, Photo CD, CDi, etc.). Operating instructions may likewise be held in a read-only memory of the device.

Figure 1:
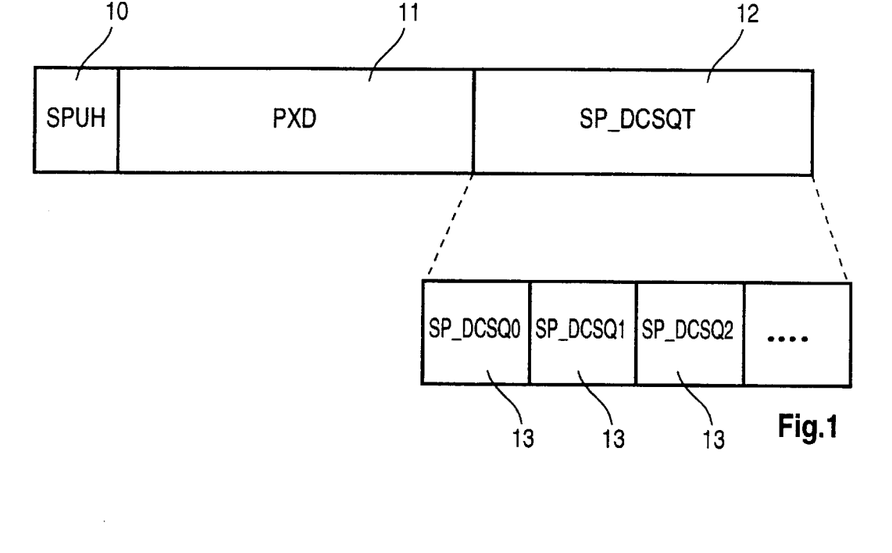
FIG. 1 shows the rough structure of a so-called sub-picture unit (SPU)

FIG. 1 shows a general illustration of the data format of a sub-picture unit. Each sub-picture unit comprises a header section (SPUH), the data for the individual pixels (PXD) and one or more sequences of display control commands (SP_DCSQT). In FIG. 1, therefore, the reference number 10 designates a data field for a header section, the reference number 11 designates a data field for the pixel data of the sub-picture and the reference number 12 designates a data field for a table of display control command sequences. The data field 12 comprises one or more data fields 13 for the display control command sequences. In FIG. 1, the individual display control command sequences are numbered consecutively and provided with the reference symbols SP_DCSQ0, SP_DCSQ1, SP_DCSQ2, etc. The above-described structure of sub-picture units corresponds to the stipulations in the DVD Standard (Version 1.0); further details in this respect can therefore also be found in this standard.

Figure 2:
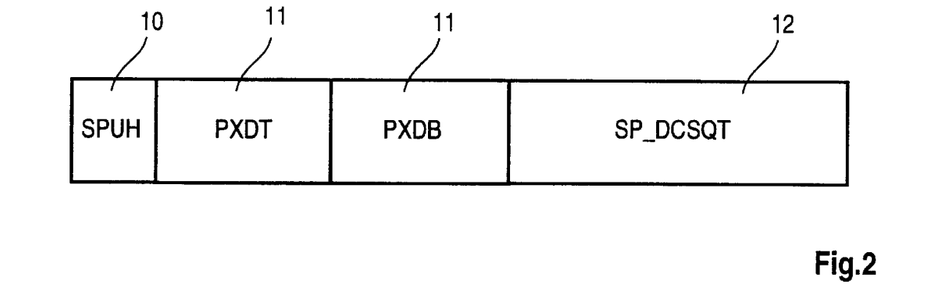
FIG. 2 shows a refined illustration of the sub-picture unit.

The header section (SPUH) of the sub-picture unit comprises the two information items for the size of the sub-picture unit as well as the start address of the table for the display control command sequences. The pixel data are stored in compressed form in the data field for the pixels of the sub-picture to be displayed. According to the DVD Standard 1.0, the pixel data of each line are compressed according to a specific run length coding method. For each pixel, two bits are stored for the type of pixel. It is thus signalled whether the pixel concerned is a background pixel, a foreground pixel or a pixel highlighted in a first or second way. A further special feature is that for the common television standards such as NTSC and PAL, the pixels for the first field are stored separately from the pixels for the second field. This is illustrated more specifically in FIG. 2. The reference symbol PXDT indicates that the pixel data of the first field are concerned, and the reference symbol PXDB indicates that the pixel data of the second field are concerned.

The table for the display control command sequences SP_DCSQT contains the sequences of display control commands which, for example, change the properties of the sub-picture displayed and control the display instants of the picture. A series of display control commands are defined for this purpose in the DVD standard 1.0. Nine display control commands are defined.

The first display control command FSTA_DSP effects unmoving display of the sub-picture on the screen irrespective of whether the user has switched off the display of sub-pictures when configuring the device. The second display control command STA_DSP controls the start instant for the display of the sub-picture. The third display control command STP_DSP controls the stop instant for the display of the sub-picture. The fourth display control command SET_COLOR selects the colours for the display of the sub-picture. The fifth display control command SET_CONTR selects the contrast for the pixels of the sub-picture in comparison with the main picture. The sixth display control command SET_DAREA determines the location where the sub-picture is displayed. The seventh display control command SET_DSPXA determines the start address of the pixel data. The eighth display control command CHG_COLCON effects a change in the colours and contrast details for the pixel data. The ninth display control command CMD_END indicates the end of a display control command sequence.

Even today, it is foreseeable that it would be desirable to provide even further display control commands in addition to the display control commands described, in order to make the display control more convenient. For example, it is desirable to provide a command which effects a flashing display for a defined detail from the sub-picture. This would be significant for the display of a marking on the screen (cursor). Another example for a new display control command relates, for example, to a command by means of which the colour values of the pixels are changed over for a specific sub-area of the sub-picture. This would improve the colour display of sub-pictures. Further examples of additional display control commands are conceivable.

Figure 3:
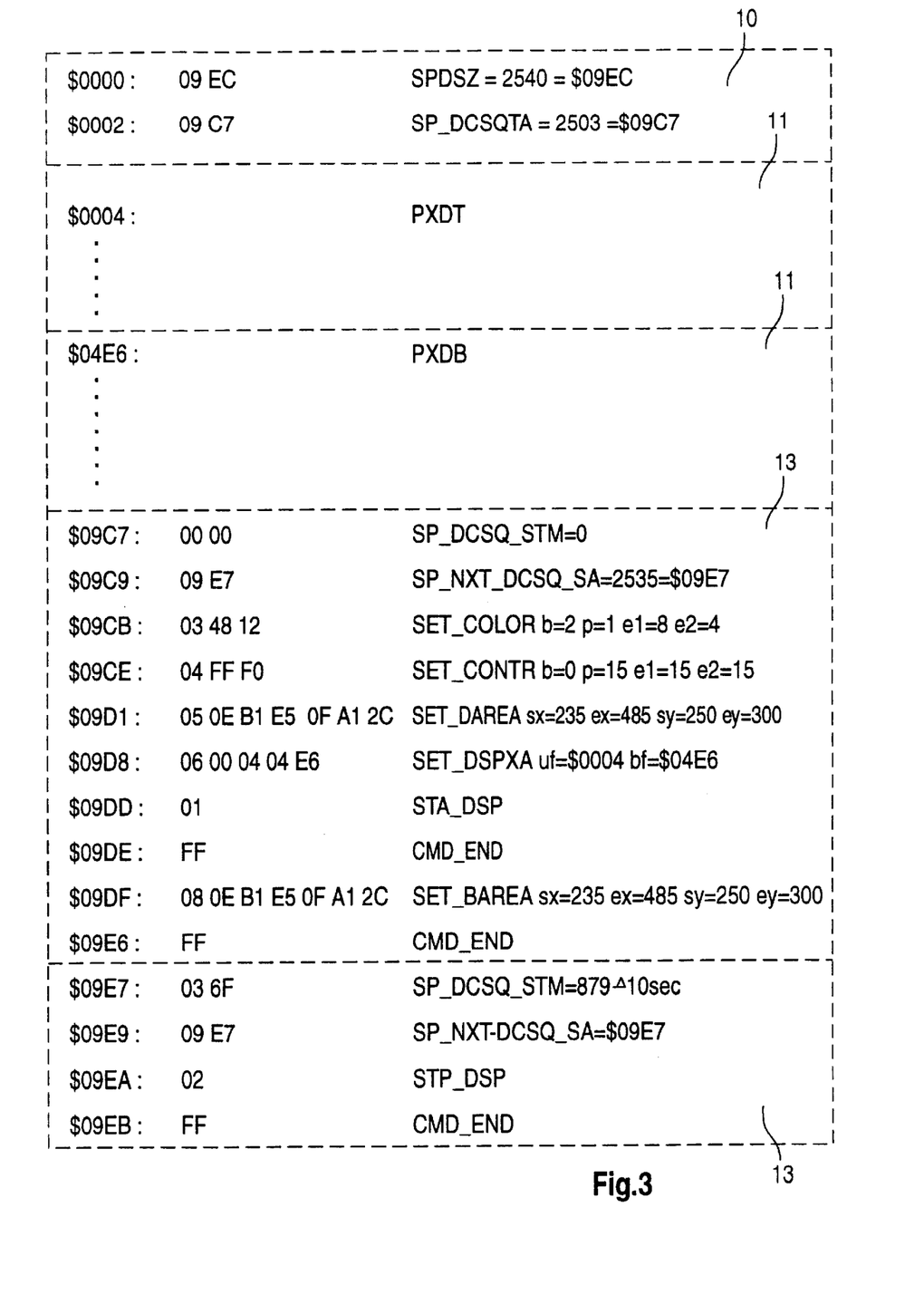
FIG. 3 shows a concrete example of a sub-picture unit serving to output an error message onto a screen device.
Figure 4:
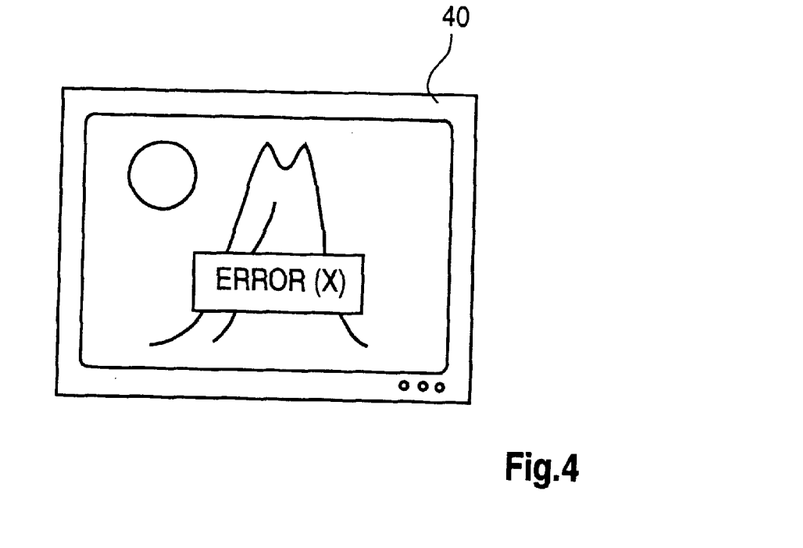
FIG. 4 shows a display of the error message on the screen device.

FIG. 3 now relates to a sub-picture unit having a new command, to be precise the new command for the flashing display of a sub-area from the sub-picture is used therein. This command is provided with the reference symbol SET_BAREA. The sub-picture unit illustrated in FIG. 3 effects the output of an error message on the screen receiver. The corresponding display of the error message is shown in FIG. 4. The error message is displayed in the lower area of the picture and is displayed as it were in the foreground in front of the actual picture. The sub-picture unit is programmed in this case in accordance with FIG. 3 in such a way that a flashing display of the error message is effected. This is now explained specifically in more detail with reference to FIG. 3. The reference number 10 again indicates the header section of the sub-picture unit. The size of the sub-picture unit is stored therein in the hexadecimal address $0000 to $0001. The size SPDSZ amounts to 2540 bytes. This information item means that the next free memory address is located at the address $09EC. The start address of the table for the display control command sequences is stored under the addresses $0002 to $0003. This start address SP_DCSQTA is located at the address $09C7. The compressed pixel data for the first field of the error message are stored in the memory locations having the addresses $0004 to $04E5. The compressed pixel data for the second field of the error message are stored in the memory locations of the addresses $04E6 to $09C6. The first display control command sequence begins at the address $09C7. The start instant of the display control command sequence relative to the start instant of the entire sub-picture unit is stored in the first two addresses. In this case, the 0 is entered there because the start instant of the first display control command sequence is intended to coincide with the start instant of the sub-picture unit. The start address of the next display control command sequence is stored in the memory locations having the addresses $09C9 and $09CA. This address SP_NXT_DCSQ_SA corresponds to the hexadecimal value $09E7. The first actual display control command SET_COLOR follows next. By means of this command, the colours for each pixel of the sub-picture are selected. The command occupies the three memory locations having the addresses $09CB to $09CD. Next comes the command SET_CONTR, by means of which the contrast values for the pixels of the sub-picture in comparison with the main picture are set. This command also occupies three 35 bytes of memory space. Starting at the address $09D1, the command SET_DAREA for the determination of the size and the location where the sub-picture is to be displayed on the screen device then follows. A rectangular sub-picture is selected, whose top left corner is located at the picture coordinates (235, 250) and whose bottom right corner is located at the picture coordinates (485, 300). In this case, the values 235 and 485 specify the X-coordinate and the values 250 and 300 the Y-coordinate of the respective corner points. This command occupies 7 bytes of memory space. Starting at the address $09D8, the command SET_DSPXA follows, which specifies the address starting at which the pixel data for the first field and for the second field are to be read out. The information items in each case correspond to the start address of the fields for the pixel data PXDT and PXDB. This command has a length of 5 bytes. The command STA_DSP is then situated under the address $09DD. This starts the display of the sub-picture unit. Up to this point, all the commands used have already been determined in the DVD Standard (Version 1.0). A first end command CMD_END is stored under the address $09DE. When this command is processed, the current address, in this case $09DE, is compared with the address which is stored as address SP_NXT_DCSQ_SA for the next control command sequence in the addresses $09C9 and $09CA. In doing so, it is identified that the addresses to be compared, in this case $09DE and $09E7, differ by more than the value one. This then results in the assessment that the first end command CMD_END is additionally followed by at least one further command, and the decoding of control commands is therefore continued at the next address $09DF. A new command SET_BAREA, which is not defined in the DVD Standard (Version 1.0), is now stored in the addresses $09DF to $09E5. The flashing display for the entire sub-picture is selected with this command. The X- and Y-coordinates correspond to those of the command SET_DAREA. The command SET_BAREA can therefore be correctly processed only by those sub-picture decoding units which are designed to produce a flashing display of sub-pictures according to this command. A further end command CMD_END is stored under the memory address $09E6. This ends the first display control command sequence. This command causes the sub-picture decoding unit to proceed to that memory address which is stored according to the information item under addresses $09C9 and $09CA.

The address $09E7 is stored there, so that the information item under the address specified there is evaluated next. This is the information item SP_DCSQ_STM, which represents a figure for the start instant of the associated display control command sequence. The decimal value 879 is stored therein, which corresponds to a time indication of 10 seconds relative to the start instant of the sub-picture unit. After this instant has been reached, which is monitored by a counter in the sub-picture decoding unit, the following commands of the second display control command sequence are processed. Firstly, there again follows the information item for the address where the succeeding sequence of display control commands is stored. The information item $09E7 is contained in this case, which is synonymous with the start address of the second display control command sequence. This indicates to the sub-picture decoding unit that the second display control command sequence simultaneously represents the last sequence of display control commands. The stop command STP_DSP follows next under the address $09EA. This command stops the display of the sub-picture unit and thus ends the output of the error message. The end command CMD_END for this display control command sequence is then also stored under the address $09EA. When this further end command is decoded, a check is now made to see whether the address of the end command is the last or penultimate address of the entire sub-picture unit. This is ascertained by comparison of the current address $09EB and the address $09EC specified in the memory locations having the addresses $0000 and $0001. In this example, the address actually is the last address of the sub-picture unit, with the result that no additional control commands have to be decoded. The interrogation as to whether the last or penultimate address of the sub-picture unit has the end command follows from the rule provided in the DVD standard whereby a sub-picture unit is only permitted to have an even number of bytes (stuffing rule). For this reason, the end command is repeated, if necessary, at the end of the last control command sequence.

The last control command sequence is continually repeated until an external control unit generates an interrupt command for the sub-picture decoding unit.

As a result of the sub-picture unit described, then, a flashing display of the error message on the screen of the television receiver is effected by an extended sub-picture decoding unit for a duration of approximately 10 seconds. After this, the display of the error message is ended. If the same sub-picture unit is processed by a sub-picture decoding unit which is not designed for a flashing display of sub-pictures, a flashing display of the sub-picture does not take place. Instead, the error message is output as a stationary error message due to the fact that the flashing command is ignored and a jump is automatically made to the second display control command sequence. The additional command SET_BAREA and the further end command under the address $09E6 would not even be processed in this case.

Figure 5:
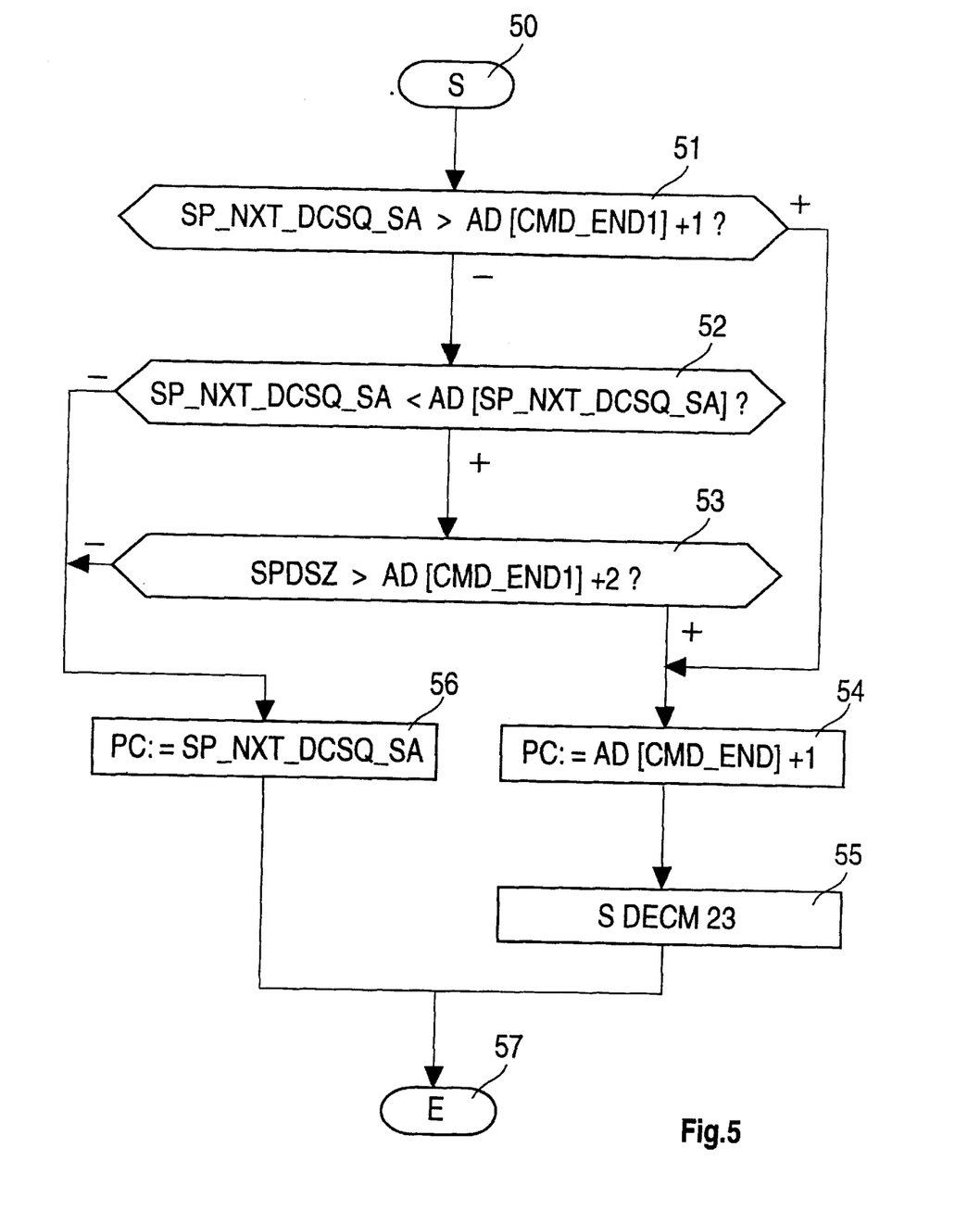
FIG. 5 shows a flow diagram for a subroutine which is processed following the decoding of an end command.

The general form of a subroutine which is carried out following the decoding of an end command CMD_END will now be explained in more detail using the flow diagram in FIG. 5. The reference number 50 designates the program start. In interrogation 51, a check is made to see whether the address information item SP_NXT_DCSQ_SA of the current control command sequence is greater than the address of the decoded end command CMD_END increased by one address value. If this condition does not apply, interrogation 52 takes place. A check is made therein to see whether the address information item SP_NXT_DCSQ_SA is less than the address where the address information item is stored. If this condition applies, an additional check is made in interrogation 53 to see whether the size SPDSZ of the sub-picture unit, which is stored under the first two addresses of the sub-picture unit, is greater than the address of the decoded end command CMD_END increased by the value two. If this condition also applies, in program step 54 the command counter PC, which specifies the address of the next command to be decoded, is set to the value of the last decoded end command increased by one. Activation of the further decoding means 23 then takes place in program step 55. The next command will then be decoded by the further decoding means 23. After program step 55 has been processed, the subroutine is ended in program step 57.

As an alternative, program steps 54, 55 and 57 are also carried out when the condition in interrogation 51 applies.

If one of the conditions in interrogations 52 and 53 does not apply, program step 56 is executed. In that step, the command counter PC is set to the value specified by the address information item SP_NXT_DCSQ_SA. The program is then ended again in program step 57. In this case, therefore, activation of the further decoding means 23 does not take place; the subsequent commands are still processed by the first decoding means 22.

Figure 6:
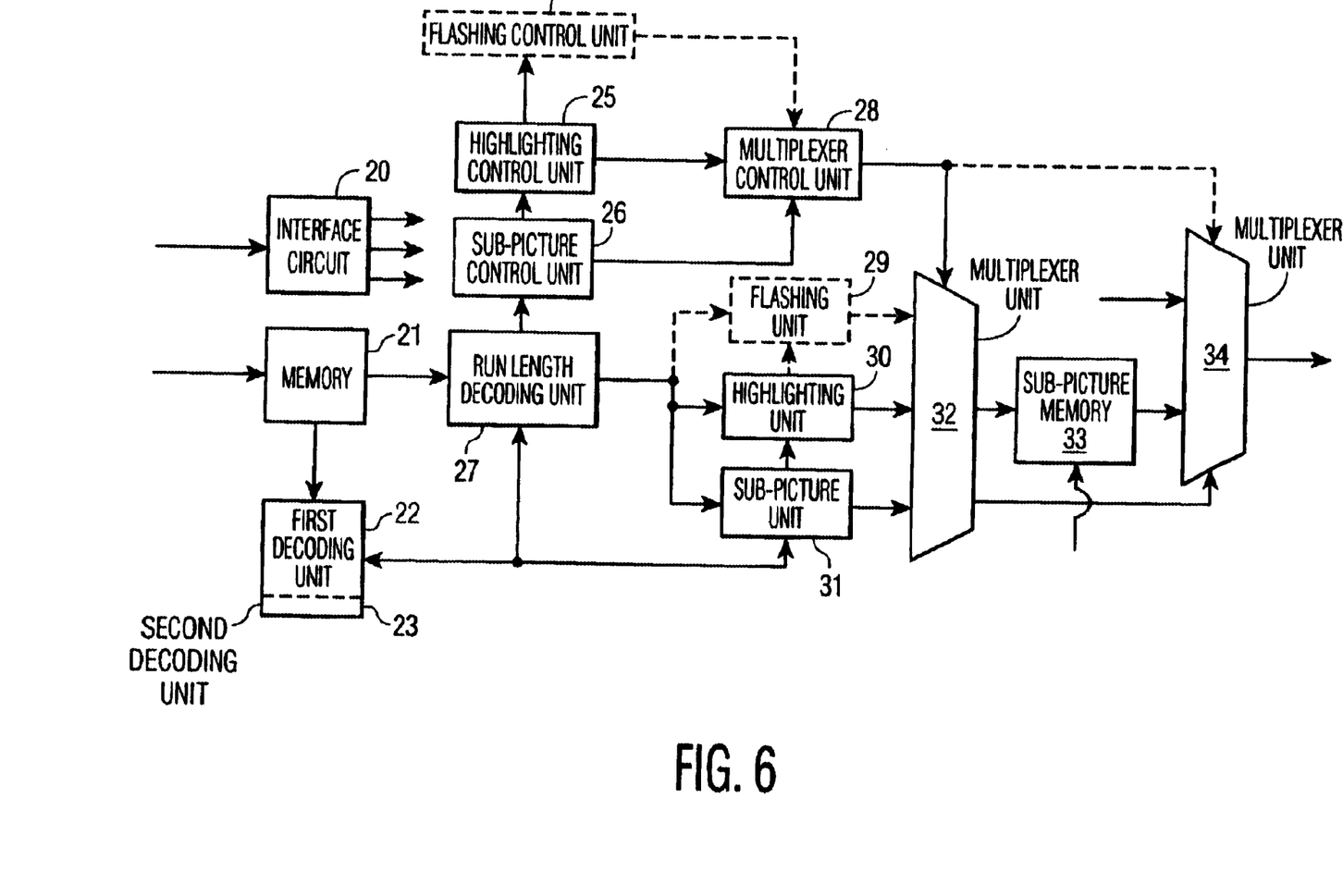
FIG. 6 shows a rough block diagram for a sub-picture decoding unit.

The structure of a sub-picture decoding unit will now be described in more detail with reference to FIG. 6. The sub-picture decoding unit serves to generate the correct sub-picture and also to mix the sub-picture with the actual main picture. The sub-picture decoding unit thus constitutes a sub-component in a DVD playback device. The reference number 20 designates an interface circuit. This interface circuit 20 is connected to a main processor which is provided for the control of the individual sub-components in the entire system. This main processor has not been illustrated for the sake of simplicity. The settings of the sub-picture decoding unit can be reconfigured as required via the interface circuit 20. The reference number 21 designates a memory for a sub-picture unit. This memory is likewise controlled by the main processor or another processor. This main processor ensures that the respectively following sub-picture unit is completely available in the memory 21 in good time. The reference number 22 designates a first decoding unit. The sub-picture unit residing in the memory 21 is decoded in this unit. In particular, the display control commands are therefore also processed therein. A second decoding unit 23 is shown separately. This second decoding unit 23 is provided in extended sub-picture decoding units. Those commands which are added to give an extended DVD Standard are processed in the second decoding unit 23.

The decoding units 22 and 23 are connected via bus links to the downstream units 24 to 27 and 29 to 31. The flashing control unit 24 is illustrated by dashed lines. It is present only in a sub-picture decoding unit which is designed according to an extended standard which, as command set for the display control commands, also contains the command for flashing display of sub-pictures SET_BAREA. In the case of those sub-picture decoding units which are not designed according to the extended standard, this flashing control unit 24 is omitted. The flashing control unit 24 generates control signals for a downstream multiplexer control unit 28. This in turn generates control signals for the multiplexer unit 32, which will be discussed in more detail below. A highlighting control unit 25 is furthermore provided. This unit also generates control signals for the multiplexer control unit 28. Furthermore, a sub-picture control unit 26 is also provided, which likewise generates control signals for the multiplexer control unit 28. The reference number 27.designates a run length decoding unit. The compressed code of the pixel data is reversed therein. The flashing unit 29 is likewise illustrated by dashed lines, because it is present only in extended sub-picture decoding units. This flashing unit then effects switching on and switching off of the corresponding pixels for the flashing display. The reference number 30 designates a highlighting unit. The latter carries out the highlighting of pixels for the area provided in the corresponding command. A sub-picture unit 31 is furthermore provided, which generates the actual sub-picture with the properties provided in the sub-picture unit. If no flashing display nor any highlighting is programmed, only the data from the sub-picture unit 31 are used for the composition of the picture. The multiplexer unit 32 serves for the selection of the pixel data required in each case. This multiplexer unit is controlled by the multiplexer control unit 28. To that end, the multiplexer control unit 28 processes the signals forwarded to it by the control units 24 to 26. The signals each specify the positions at which the individual picture properties are to be reproduced. The multiplexer unit 28 thereupon calculates the requisite control signals for the multiplexer control unit 32. The sub-picture produced in this way is stored in the sub-picture memory 33. In this case, only the colour values are stored in the sub-picture memory 33. The contrast values are present at a separate output of the multiplexer unit 32 and serve to control the second multiplexer unit 34, which is provided for mixing the main picture with the sub-picture. To that end, the data stream from a video decoding unit (for example MPEG video decoder) is fed to it via a further input. In order to insert the data of the sub-picture into the video data stream at the correct position, it is also necessary, of course, to feed to the multiplexer unit 34 suitable control signals, which may also be generated by the multiplexer control unit 28. The complete video data stream is present at the output of the multiplexer unit 34.

The sub-picture unit illustrated in FIG. 3 can be stored in a read-only memory (EPROM, etc.). In the case of other sub-picture units, such as subtitles, for example, storage on a storage medium, in particular optical image carriers (DVD, Photo CD, CDi, Minidisk, etc.) can also be effected. Of course, storage on other storage media such as magnetic tapes and magnetic disks, etc., also comes into consideration.

Figure 7:
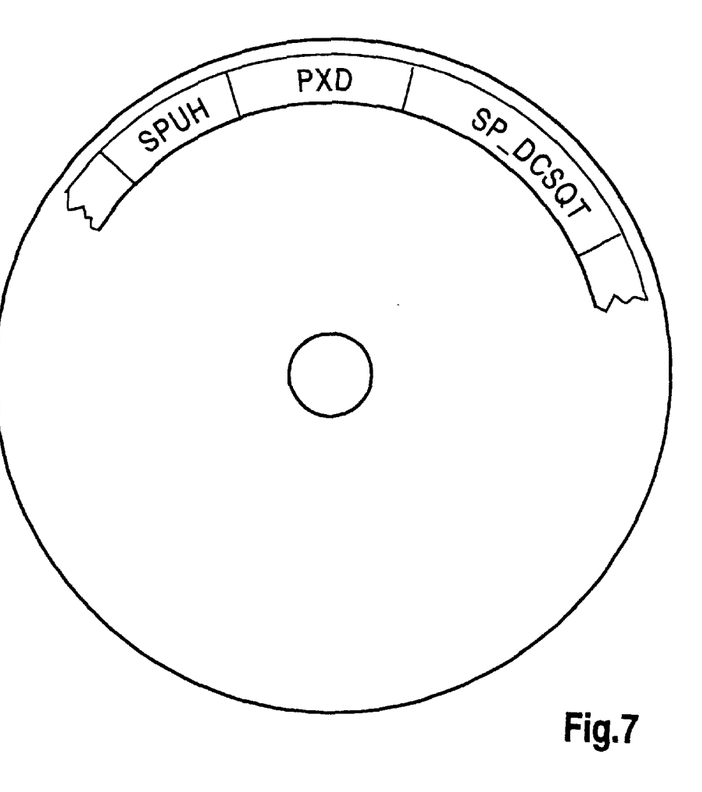
FIG. 7 shows the illustration of a storage disk with a stored sub-picture unit.

FIG. 7 shows a DVD disk which has stored a sub-picture unit.

The invention has been explained using the example of a DVD playback device. It is not restricted to this, however. Command sequences for the control of units are also known in other technical fields. Printer control is cited as an example, in which a number of control commands which the printers have to process are also standardized. The problem therefore arises in this case, too, that the printing devices are not designed from the outset for all supplementations of the printer control commands. The invention can also be employed to enable compatible processing of new, added printer control commands. The display control in computer monitors with the aid of graphics cards is also cited as a further application of the invention. The same may also apply to control of a fax machine when a standardized control language is provided therefor. Further examples are possible.

What is claimed is:

1. Apparatus for processing display control command sequences of a sub-picture unit in a video stream for displaying additional information on a display device, said apparatus having decoding means for the display control commands, the decoding means being designed to decode a set of basic display control commands, as well as a set of additional display control commands, in a display control command sequence, the display control commands of the set of basic display control commands being positioned at the beginning and the display control commands of the set of additional display control commands being positioned at the end of the display control command sequence separated by an end command, a display control command sequence having an address information item, which specifies the start address of the next display control command sequence;

the decoding means being designed to decode the display control commands of the set of basic display control commands in a display control command sequence one after the other and being designed in such a way that when an end command is processed, they carry out a comparison of the address of the end command with the address information item regarding the start address of the next display control command sequence and identify, from the difference between addresses, whether the end command is additionally followed by at least one further display control command from the set of additional display control commands, and in that the decoding means are designed in such a way that they process the at least one further display control command of the set of additional display control commands if it has been identified that at least one further display control command additionally follows.

2. The apparatus according to claim 1, in which the decoding means are designed in such a way that when a further end command is processed after the processing of the at least one further display control command they begin the processing of the next display control command sequence at the address which is specified by the address information item regarding the start address of the next display control command sequence.

3. Apparatus according to claim 2, in which, for the case where no other display control command sequence is provided as the next display control command sequence, the address information item regarding the start address of the next display control command sequence specifies the beginning of the last display control command sequence, and in which, when the address information item regarding the start address of the next display control command sequence is decoded following the decoding of the last end command, the control of the unit to be controlled is set or the last display control command sequence is repeated.

4. Apparatus according to claim 1, in which the decoding means are designed in such a way that, for the case where the address information item regarding the start address of the next display control command sequence points to the beginning of the last display control command sequence, in addition or as an alternative to the comparison of the addresses of the end command and the address information item regarding the start address of the next display control command sequence, the decoding means check whether the address of the first end command is the last or penultimate address of the sub-picture unit, and in which, if that is not the case, it is identified that the first end command is additionally followed by at least one further display control command which is selected from the set of additional display control commands.

5. Apparatus according to claim 1 in which the apparatus has a memory unit in which the display control commands of the display control command sequence can be stored.

6. Apparatus according to claim 1 in which the display unit is a television set and the decoding means are integrated in a film playback device.

7. Method for generating a display control command sequence for a display unit, which is provided for an instruction decoding apparatus for processing a display control command sequence according to one of claims 1 to 6 or 8, the display control command sequence having first display control commands which are selected from a set of basic display control commands being known to a first version of decoding units, characterized in that:

a number of second display control commands which are selected from a set of additional display control commands are provided in the display control command sequence, the set of basic and additional display control commands being known to a second version of decoding units, and in that;

the number of second display control commands are arranged in combination after the display control commands of the basic set, the second display control commands being separated from the first display control commands by an end commande.

8. Method according to claim 7, in which the display control command sequence is stored on a storage medium, in particular a storage disk or a magnetic tape.

9. Storage medium for storing a display control commands sequence of a sub-picture unit in a video stream for displaying additional information on a display device, the display control commands being stored sequentially on the storage medium, the display control command sequence having first display control commands which are selected from a set of basic display control commands, being known to a first version of decoding units, wherein the display control command sequence comprises an address information item regarding the start address of the next display control command sequence, characterized in that:

the sequence furthermore has a number of second display control commands which are selected from a set of additional display control commands, the set of basic and the set of additional display control commands being known to a second version of decoding units, the display control commands of the set of additional display control commands being stored in such a way that they are arranged after the display control commands of the basic set, so that they are read out only after the display control commands of the basic set, the second display control commands being separated from the first display control commands by an end command.

10. Storage medium according to claim 9, in which said storage medium is designed as a magnetic tape or as a storage disk.

11. Method for processing display control command sequences of a sub-picture unit in a video stream for displaying additional information on a display device, the display control commands being partitioned in a set of basic display control commands, as well as a set of additional display control commands, in a display control command sequence, the basic display control commands being positioned at the beginning and the additional display control commands being positioned at the end of the display control command sequence separated by an end command, a display control command sequence having an address information item, which specifies the start address of the next display control command sequence, comprising the steps of:

decoding the display control commands of the set of basic display control commands in a display control command sequence one after the other and when an end command is processed, comparing the address of the end command with the address information item regarding the start address of the next display control command sequence and identifying, from the difference between the addresses, whether the end command is additionally followed by at least one further display control command from the set of additional display control commands, and processing the at least one further display control command of the set of additional display control commands if it has been identified that at least one further display control command additionally follows.

* * * * *